UNITED STATES PATENT OFFICE.

CHARLES A. LA MONT, OF NEW YORK, N. Y., ASSIGNOR TO C. A. LA MONT AND DAVID A. BURR, OF WASHINGTON, D. C.

IMPROVEMENT IN PRESERVING EGGS.

Specification forming part of Letters Patent No. 51,263, dated November 28, 1865.

*To all whom it may concern:*

Be it known that I, CHARLES A. LA MONT, of the city, county, and State of New York, have invented a new and useful Preparation of Egg; and I do hereby declare the following to be a full and exact description thereof and of the manner of obtaining the same.

My invention consists of egg desiccated at a temperature but slightly greater than the highest degree to which it may naturally be exposed in any climate, and in such a manner as to retain its natural flavor unimpaired and be easily dissolved in cold water.

This improved preparation of egg is obtained either by drying a batter of beaten eggs in an exceedingly thin coat or film upon revolving metallic plates alternately dipped therein and then dried by exposure to a current of heated air at a temperature but just exceeding the highest degree of atmospheric heat which the desiccated egg can possibly be afterward subjected to, or by forcing the egg-batter, by means of a powerful blast of air, into a thin spray, which is made to fall through a current of heated air, as aforesaid, and dry in small, fine particles.

The egg so dried in fine flakes or small particles at a comparatively low temperature differs essentially from the ordinary quality of desiccated egg in that the latter is of a dull, dark color, has an unpleasant and peculiar flavor, and is with difficulty dissolved in warm water, whereas my improved article is of a bright, lively color, is pure and fresh in flavor, and dissolves very quickly in cold water, retaining all the qualities of sweet, fresh eggs, and will keep untainted in any climate.

Having thus fully described my invention, I claim—

As a new article of manufacture, eggs desiccated and hardened into small, bright, thin flakes or particles, readily soluble in cold water, and retaining their qualities and flavor, all substantially as hereinbefore set forth.

C. A. LA MONT.

Witnesses:
 DAVID McADAM,
 CHAS. A. CLARK.